United States Patent
Sousa et al.

(10) Patent No.: US 7,340,325 B2
(45) Date of Patent: Mar. 4, 2008

(54) PRIORITY POWERDOWN SYSTEM AND METHOD FOR POWER DISTRIBUTION SYSTEMS

(75) Inventors: Marc D. Sousa, McKinney, TX (US); Michael Sean McCormack, Gloucester, MA (US)

(73) Assignee: Texas Instruments Incorporated, Dallas, TX (US)

( * ) Notice: Subject to any disclaimer, the term of this patent is extended or adjusted under 35 U.S.C. 154(b) by 40 days.

(21) Appl. No.: 11/196,790

(22) Filed: Aug. 3, 2005

(65) Prior Publication Data
US 2007/0030613 A1 Feb. 8, 2007

(51) Int. Cl.
*H02J 13/00* (2006.01)

(52) U.S. Cl. .................. 700/295; 361/90; 709/223; 713/320

(58) Field of Classification Search ............. 700/286, 700/295; 709/223; 713/300, 320, 321; 361/90
See application file for complete search history.

(56) References Cited

U.S. PATENT DOCUMENTS 6,393,474 B1 * 5/2002 Eichert et al. ............. 709/223
2006/0047800 A1 * 3/2006 Caveney et al. ............ 709/223
2006/0125422 A1 * 6/2006 Costa ........................ 315/294
2006/0142900 A1 * 6/2006 Rothman et al. ........... 700/295

* cited by examiner

*Primary Examiner*—Leo Picard
*Assistant Examiner*—Douglas S Lee
(74) *Attorney, Agent, or Firm*—Wade J. Brady, III; Frederick J. Telecky, Jr.

(57) ABSTRACT

A power controller for power sourcing equipment in a distributed power network provides power down policies and priority in the event of a power supply failure. The power down priority and policy permits implementation of a rapid decrease in the power demand of the distributed power network to avoid overload of a backup power supply. The priority may be derived based on the relative position of port information in a linked list. Devices associated with a high priority can remain powered in response to a main power supply failure, while lower priority devices can be rapidly powered down to reduce the overall load demand on the backup power supply. The ability to configure ports on the basis of priority and available policies provides a flexible and simple implementation of a response in the event of a main power supply failure.

21 Claims, 2 Drawing Sheets

PRIORITY POWERDOWN SYSTEM AND METHOD FOR POWER DISTRIBUTION SYSTEMS

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to a power down system and method for power changes in a power distribution network, and relates more particularly to a programmable power down policy to be applied during a power change in a power distribution network.

The development of sophisticated networks for transferring information has driven a number of technologies including the provision of power over network connections. For example, a network connected device for transferring information over the network may receive power from the network so that alternate power sources for the device are not necessary. A typical advantage associated with providing power over a network is that a user can physically connect a device to the network to transfer information, and the device can be powered without the need of running additional power lines to the physical location of the user. A well known example of a communication network is based on an Ethernet protocol, where information is exchanged between various senders and receivers connected to the network, often through a switch. Power over Ethernet (POE) may be provided through power sourcing equipment (PSE) that distributes power to powered devices (PDs) in a network environment. The network environment for realization of a POE system typically supports the IEEE 802.3af standard.

The type of POE equipment that meets the IEEE 802.3af standard has a number of associated costs, one of the major costs being power supply capacity. The power supply rating is selected to sustain power to certain devices, such as high priority devices, in the event of a power supply failure. The POE equipment can identify and control which devices connected to the network should be powered down in the event of a main power supply failure, so that the remaining devices can be appropriately powered with a backup power supply. Techniques for identifying devices to be powered down, causing the devices to be powered down and assessing the power requirements for devices on the network presently exist where the settings for each of the devices are maintained manually. That is, a designer or user manually causes a particular device to be identified to the POE equipment with appropriate indications for how the device should be controlled in the event of a main power supply failure. For example, the device may be shut down, may proceed through a power on reset (POR) or may continue to be powered with little variation in the input power supply. These types of techniques are somewhat inflexible in that any changes to the device configurations may impact a number of devices and often demand the attention of a skilled professional.

A network with equipment that enables power delivery and distribution over the network can support many different types of equipment, especially equipment connected to a network switch for the transmission of information and power. For example, internet protocol (IP) telephones, wireless access points, IP security cameras, point-of-sale (POS) registers, and so forth, may be connected to a network and receive power while communicating with network equipment. A network manager or designer typically assesses the deployment of different types of equipment and the power needs of the equipment with respect to handling power supply switchovers or failures. Some types of equipment may have high priority for maintaining power such as critical systems in the network, while other equipment may have low priority for maintaining power.

As an example, office environments typically place higher priorities on maintaining the operations of telephones over wireless access points. As another example, a network manager may place a higher priority on POS registers in a retail setting over other less critical equipment. Network switches that supply power to network devices typically have a power supply system with a certain capacitance. In the event of a main power supply failure, that capacitance is drawn upon until the loading of the switch can be reduced, such that a backup supply can accommodate the power needs of the switch, without overload. The backup power supply typically has less power and less capacitance than the main power supply.

One method for supplying power over a network involves the introduction of a power supply at a network connection to inject power into the network. Alternately, network switches that handle information transfer among the network connections may include PSE to deliver power over the network. In either case, typical network power supplies are specified to supply adequate power for expected device loads, while avoiding excess or unused capacity to avoid higher equipment costs. In addition, backup power supplies are often used to supply power to network devices, either in conjunction with a main power supply or as an alternative to the main power supply in the case of a main power supply malfunction. Again to avoid excess costs, backup power supplies are often specified to have a lower rating or capacity than the main power supply.

Network power system designs tend to handle main power supply failures by shutting down non-critical network PDs to match the power load to the capacity of the backup power supply. Main power supplies often have large power storage capacity that can be made available to the network while powered devices on the network are shut down to reduce the load on the network power supply. When the main power supply fails, the power storage maintains power to the network while devices are shut down to reduce the power demand on the backup power supply. The reduction in power demand prevents the lower capacity backup power supply from being overloaded.

The power storage in the main power supply is typically realized as a large capacitance formed with one or more large capacitors. The large capacitance used to provide power to the network during the switchover or power down interval is usually very expensive, and represents a large portion of the overall cost associated with supplying distributed power over the network. However, the large capacitance can be a critical element in maintaining power to devices on the network in the event of a main power supply failure. For example, there may be devices on the network that are considered critical for the network application. Power to these critical devices should not be interrupted, even in the event of a main power supply failure. However, if the typically lower capacity backup power supply is overloaded when the main power supply fails, critical devices may lose power. The large capacitance acts as a power buffer to support a high power demand while non-critical devices are shut down to bring the power demand within the capacity of the backup power supply.

The determination of critical and non-critical devices, that is, device priority, is usually configured at the network power supply control, which is usually found in a network switch, for example. The control is set to power down certain non-critical or low priority devices in the event of a main power supply failure, while maintaining power to critical or high priority devices. The network switch settings take into account the power load of the critical devices so that the backup supply is adequate to the task of maintaining critical device power. Typically, as many devices as possible are powered in the event of a main power supply failure, without overloading the backup power supply. Accordingly, the ports to which network devices are connected are defined in the network switch to either receive power or not in the event of a main power supply failure. Lower priority devices are shut down as rapidly as feasible in the event of a main power supply failure to reduce the latency related to the large capacitance and to avoid overloading the backup power supply.

The faster the lower priority devices can be shut down, the faster a power demand or load that can be handled by the backup power supply is reached. The length of this interval during fast power down determines the rating or size of the large capacitance that supports power supplied to the network during the load change interval. By obtaining a rapid response, the amount of capacitance needed to supply storage power can be reduced, and thereby contribute to reducing overall cost of the power equipment used to power the network device.

When devices connected to the network are set up to receive power, they are given a priority indication for behavior during a main power supply failure event. The network switch is configured to maintain the indication for each PD to cause the low priority devices to be quickly shut down in the event of a main power supply failure. The network switch configuration can be somewhat cumbersome in that each device is manually set to have a particular priority or behavior in the event of a main power supply failure. Anytime a network PD is added to the network, the network switch is manually reconfigured to indicate the behavior of the added device after a main power supply failure. If an added network PD has a higher priority than existing devices that are to be maintained in a powered state, the network designer or manager usually reviews the power budget available from the backup power supply to determine if there is enough backup capacity to power all devices that should be powered after a main power supply failure. If the power consumed by the devices to be powered exceeds the power budget available from the backup power supply, one or more devices are reclassified to be powered down after a main power supply failure. Otherwise, the addition of the high priority device may overload the backup power supply when the main power supply fails, causing the backup supply to shut down or fail. Reclassification of the various devices is therefore important, but can be cumbersome when done manually.

A number of other approaches are available to classify PDs for behavior after a main power supply failure. The various methods offer advantages or disadvantages that are typically related to the network application. Presently, there is no simple way to select or program a given classification method for describing PD behavior in the event of a main power supply failure.

SUMMARY OF THE INVENTION

In accordance with the present invention, there is provided a programmable feature for specifying priorities of devices connected to a network for power supply switchover events when a main power supply fails. The programmable feature is obtained at a centralized network switch that permits power down priority to be established at a centralized location. A network switch is provided for control of the power down priority and supply of power to devices in the event of a switchover. The network switch includes a programmable indicator that provides indicia of priority assigned to a given device and what policies should be enacted.

According to an advantage of the present invention, each network port is assigned a power down priority, which determines a power down policy to be applied.

According to an aspect of the present invention, the indication for selection of a priority to enact a given power down policy may be established in software, firmware or hardware. The indication may be derived from a network switch, for example one that includes a power controller responsible for detecting switchover events and controlling the power supply to the network before, during and after a switchover event. The indication may also be derived from a host computer or network switch responsible for maintaining network status or responding to network events.

According to another aspect of the present invention, a power controller IC is provided with a shut down pin that permits a direct hardware signal path to enact a given policy and shut down all low priority devices, while maintaining power to high priority devices. The IC can be configured through software, for example, to identify devices, or the ports to which they are assigned, as having one of a number of priority levels. Each priority level is mapped to a given power down policy. The various priority devices or ports are normally powered during normal operating conditions. In the event of a primary power supply failure, the shutdown input on the IC changes state and invokes a shutdown policy for each device or port indicated by internal settings. According to at least one policy, the IC commands an immediate shutdown for all devices or ports with a given priority, as well as a disable for those devices or ports until the failure event is overcome or corrected. Devices or ports assigned to other priority levels may have different power down behaviors, such as entering standby mode, or maintaining normal operation during the failure.

BRIEF DESCRIPTION OF THE DRAWINGS

The present invention will become more clearly understood from the following detailed description when read in conjunction with the accompanying drawings, in which.

DETAILED DESCRIPTION OF THE PREFERRED EMBODIMENTS

In the following description, the terms port, output and network connection refer to similar items, and are used interchangeably without limiting the individual items to a specific embodiment.

Figure 1:
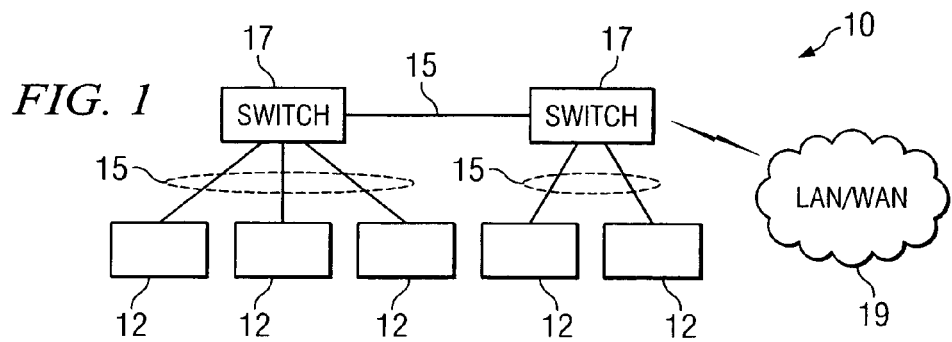
FIG. 1 is a block diagram of an information network that also permits power distribution.

Referring now to FIG. 1, an illustration of a network for sending and receiving information is provided generally as network 10. Network 10 includes various devices 12 that can send and receive information over network connections 15. Traffic on network 10 through connections 15 is handled through a network switch 17. Network switch 17 handles routing of information between the various devices 12 and local area network (LAN) or wide area network (WAN) 19.

According to an embodiment of the present invention, switch 17 also supplies power to devices 12 over network connection 15 throughout a distributed power network. When a device 12 is coupled to the network on connection 15, the new device can send and receive information, as well as receive power from switch 17. The embodiment illustrated in FIG. 1 is illustrative and not limiting in the present invention. For example, a separate power supply device can be provided on a network connection 15 to distribute power over connections 15. In addition, a number of switches 17 may be provided in network 10, each of which can supply power to connected devices 12. Devices 12 can take the form of any type of any networkable device including personal computers, handheld devices, IP telephones, IP security cameras, point-of-sale registers, wireless access points, and so forth. The power supplied by switches 17 is provided by a power supply connected to switch 17 or provided as a part of switch 17. When network 10 is configured to have an Ethernet protocol, this type of arrangement for power distribution is typically referred to power over ethernet (POE), and the switches are typically referred to as power sourcing equipment (PSE). In addition, devices 12 are typically referred to as powered devices (PD), and network 10 is typically configured to have equipment that supports a relevant standard, such as the IEEE 802.3af standard, for example.

When switches 17 supply power to devices 12, backup power supplies are typically used to provide power to devices 12 in the event of a primary power supply failure. However, due to cost considerations, backup power supplies typically have less capacity than the primary power supplies. Accordingly, when a primary power supply fails and a switchover to a secondary power supply occurs, the capacity of the backup power supply is typically not enough to power all of devices 12. Also, a switchover event from primary to backup power supply often relies on large power storage capacitors that supply power to the network while low priority devices or ports are shutdown, for example. The large capacitors contribute to preventing overloading of the backup power supply while the power load is reduced to a power level commensurate with the backup power supply capacity. For example, some of devices 12 may be powered down, or may be powered in a low power mode when the backup power supply is brought online or otherwise relied upon for a power supply. The more quickly the power load on network 10 can be reduced in the event of a power supply switchover, the smaller the storage capacitors can be, due to the reduced requirements for maintaining load power in the switchover event.

Various solutions exist for quickly powering down loads related to the operation of devices 12, however, typical solutions call for settings to be made in each switch 17 for each device 12 to define the switchover behavior for each device 12. For example, switch 17 may have a setting for a device 12 that calls for the device to be immediately powered down in the event of a power supply switchover. If a device 12 has a more critical function, switch 17 may be programmed to maintain power to that device 12 at a higher priority level.

Another solution for quickly reducing loading in a power distribution network when a power supply switch over event occurs is to do a power reset on all devices and then supply power to critical devices 12 that have a high priority. In either case, a controller for power to devices 12 from switch 17 is typically supplied in switch 17 to act on a signal that indicates when the power supply switchover event occurs.

Figure 2:
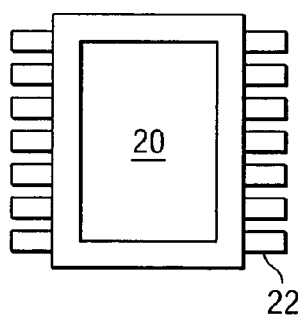
FIG. 2 is an abstract illustration of an integrated circuit with a power reset input pin.

Referring now to FIG. 2, an integrated circuit 20 represents a power controller for power supplied through switch 17. Controller 20 includes a pin 22 that provides a hardwired line capable of signaling controller 20 in the event of a main power supply failure. When a main power supply failure occurs, the signal supplied to pin 22 prompts a desired power control response when the load on the power supply on switch 17 is to be quickly reduced. Controller 20 is programmed to respond to the signal on pin 22 to quickly index through the list of ports assigned a given priority involved in the shut down of low priority devices 12, for example, so that a rapid power supply switchover event can occur. The rapid switchover event permits the storage capacitors used to power the load during the power supply switchover to be reduced in size.

One prior difficulty in conducting the rapid power down of non-critical or low priority devices 12 to reduce the load seen by the backup power supply is that the programmed information about the devices is somewhat static. That is, whenever hardware changes are made to network 10, the PSE is typically reprogrammed to account for the appropriate policy applied to the devices 12. If devices 12 are added, or removed from network 10, there is an impact on the main power supply capacity, as well as on the backup power supply. For example, the main power supply should have enough capacity to supply power to all devices 12 connected to switch 17 in network 10. In addition, critical or high priority devices 12 that are to remain powered in the event of a power supply failure and switchover should, in the aggregate, not exceed the capacity of the backup power supply. Accordingly, whenever changes are made to network 10, the PSE is manually set to invoke the appropriate response for each of devices 12 in the event of a power supply switchover. The modification of the PSE can be time consuming and somewhat costly, especially in view of the large amount of hardware changes that a network 10 typically undergoes.

Figure 3:
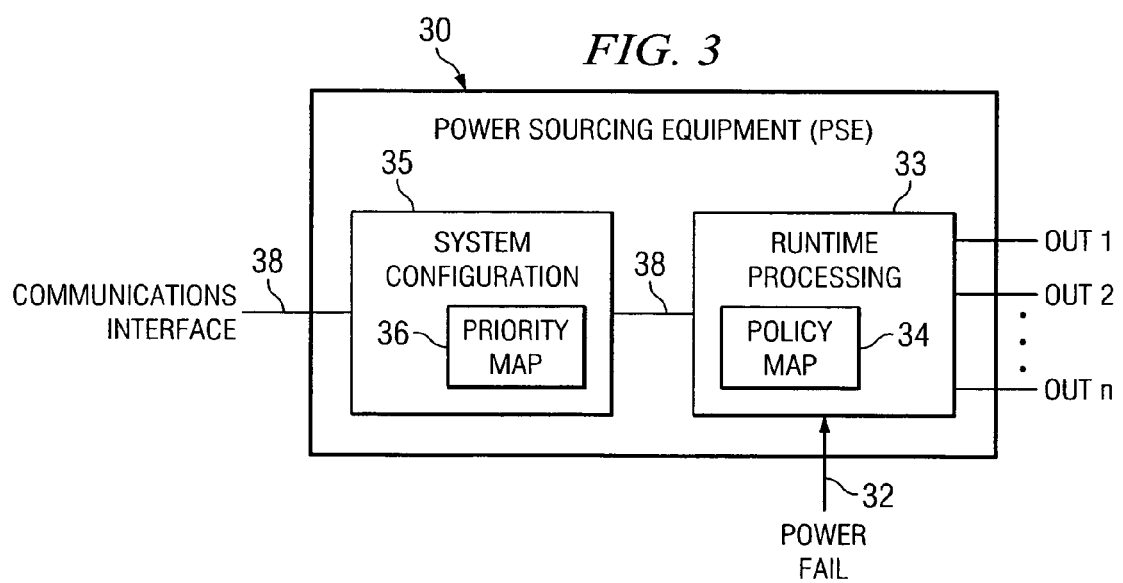
FIG. 3 is an abstract block diagram of a PSE power down policy application in accordance with the present invention.

Referring now to FIG. 3, in accordance with the present invention, a PSE 30 is provided with a programmable priority power down function, responsive to a signal 32. In the event of a power supply switchover, indicated through signal 32 being applied to a runtime processing 33, a policy map 34 determines how power is controlled to PSE 30 outputs OUT1-OUTn during the switchover event. Policy map 34 applies a power down policy during a power supply switchover to rapidly power down appropriate devices 12, for example, to avoid overloading the backup power supply. Any of the policies discussed previously may be selected, and applied according to policy map 34 in PSE 30. For example, a rapid power down policy based on a priority map 36 may be selected to quickly power down low priority devices 12. Priority map 36 can be configured to assign a priority to a port to contribute to the implementation of a fast power down policy. The fast power down policy can be made to be flexible and simply applied with this approach, so that controller 20 (FIG. 2) need not be reconfigured each time there is a physical change to network 10. The policies available in policy map 34 can be assigned to one or more devices 12 that are grouped together in a particular priority, for example. Each priority grouping can have a different power down policy, which permits the response to a main power supply failure to be flexibly and quickly applied. The selection of a policy assigned to a given priority mapping that can be implemented during a power supply switchover greatly increases the flexibility of the power equipment in network 10 and leads to rapid switchover events to permit a decrease in the storage capacitance needed during a switchover event.

PSE 30 includes functionality for programming a priority power down function in a configuration mode to change system configuration 35. System configuration 35 is used by run-time processing 33, which implements the configured power down policy. System configuration 35 is coupled to a communications interface 38 to permit a user to modify priority map 36. Communication interface 38 is also coupled to run-time processing 33 to permit operational data to be revealed to an external interface, such as a host computer or user interface. Communication interface 38 also permits the user to modify policy map 34 to specify a particular power down policy for a given priority grouping as identified in priority map 36. The task of configuring PSE 30 through system configuration 35 is typically accomplished off-line, or not in real-time. In addition, the configuration task is typically done by a user through operations conducted at PSE 30, or through a network monitoring station. Communication interface 38 transports commands and status between PSE 30 and an external system, such as a host subsystem or user interface.

After PSE 30 is configured through system configuration 35, outputs OUT1-OUTn are operated in accordance with the applied configuration during run-time. The operation of outputs OUT1-OUTn is done in real time, and run-time processing 33 provides a dynamic output response in relation to the distributed network power system, including considerations for input power, configuration changes and power failures. When a power failure is annunciated through signal 32 applied to run-time processing 33, policy map 34 is accessed to determine the attributes of the ports controlled by PSE 30. Run-time processing 33 then implements the policies for the different ports, based on their priority grouping and the policy assigned to each priority grouping. Power delivered over outputs OUT1-OUTn is thus controlled by run-time processing 33 in accordance with the demands of the given application.

One function that can be represented by pin 22 is an override of an internal POR function. For example, holding pin 22 to a low level can reset internal devices, such as state machines, registers and I²C interfaces. When the signal supplied to pin 22 transitions to high logic level, a delay counter or timer can be activated during which internal startup or reset configurations can be implemented, such as loading preset values into registers, state machines or I²C interfaces. By providing an internal indication for the behavior of a signal applied to pin 22, controller 20 can provide a number of flexible power policy operations. For example, an internal setting can be applied to indicate how controller 20 should react in the event of a logic high signal being applied to pin 22. In accordance with the present invention, the internal indication in controller 20 can be set to cause a logic high signal applied to pin 22 to enact a power down policy as described below. The setting of the internal indication can be achieved in hardware, software or through a communication interface, for example.

Figure 4:
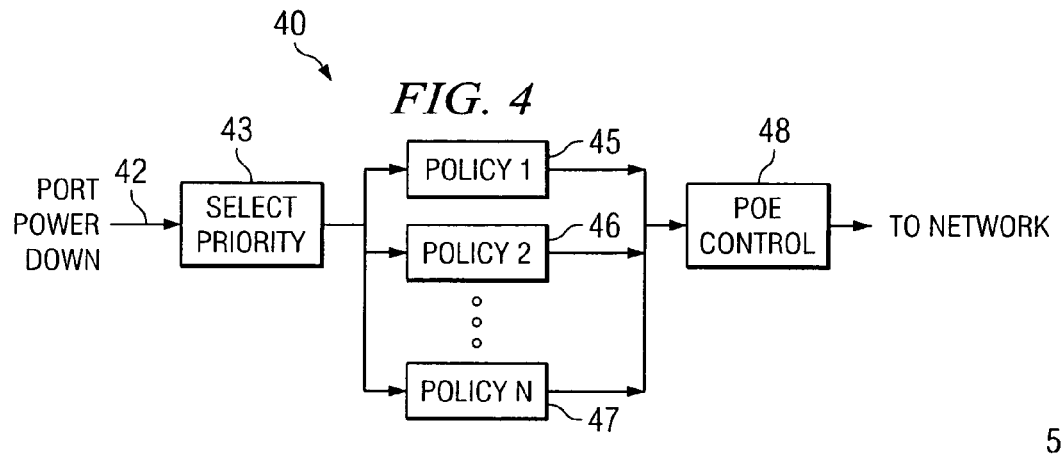
FIG. 4 is an abstract block diagram of power down policy enactment in accordance with the present invention.

Referring now to FIG. 4, a block diagram 40 illustrates the run-time operation of run-time processing 33 in implementing a policy for a selected priority grouping during a power supply switchover event. A power supply status signal is asserted, for example, on pin 22 of controller 20, initiating power down processing to generate port input signal 42, which indicates a power supply switchover policy for the port should be determined. Block 43 retrieves a priority grouping for the port being processed and determines which policy should be applied, based on the content of policy map 34. Depending on the configuration of policy map 34, block 43 may cause a fast power down policy to be applied, illustrated as a block 45, which can rapidly power down low priority ports. Block diagram 40 illustrates the availability of other power down policies that can be selected for application in the event of a main power supply failure. Policies 1-N illustrated as blocks 45-47 represent different policies that may include standard or default policies, for example. Policies are not necessarily dependent upon port priority, and any type of priority/policy relationship can be configured. The different policies may include maintaining power, standby states, PORs, fast power down and so forth. Once a power supply switchover event policy is determined, a POE controller 48 applies the policy to devices 12 connected in the network.

Figure 5:
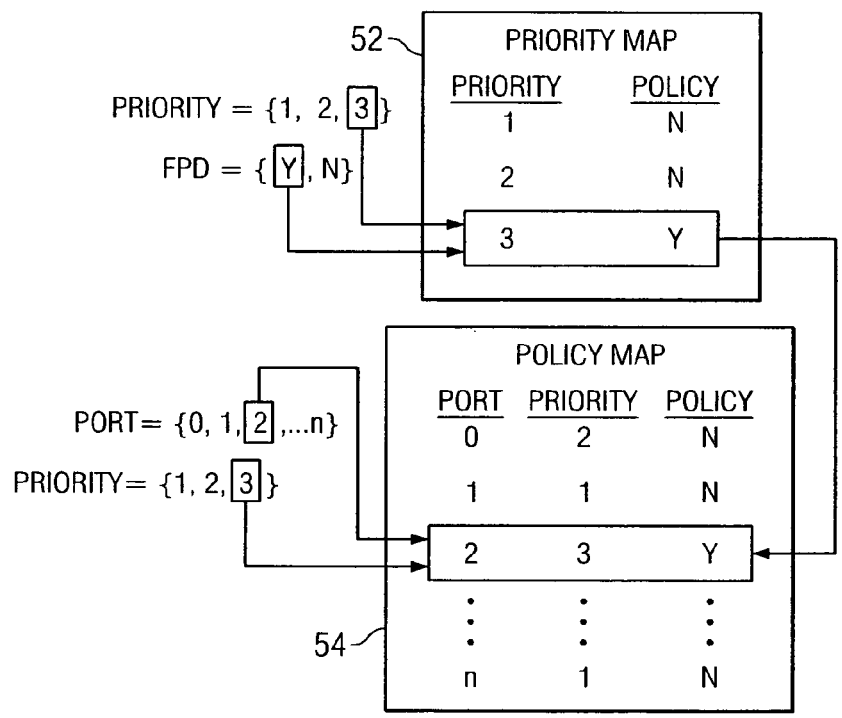
FIG. 5 is an abstract block diagram illustrating power down policy configuration in accordance with the present invention.

Referring now to FIG. 5, a diagram 50 illustrates the configuration of a POE system to automatically implement a desired power down policy in the event of a main power supply failure. Configuration of the priority power down feature includes the selection of a priority level in priority map 52 for a given power down policy. In diagram 50, an exemplary embodiment is illustrated that includes three different priority levels and a simple on/off or yes/no selection for implementation of a fast power down policy. In priority map 52, the three different priority groupings are assigned respective power down policies that are applied in the event of a main power supply failure. Priority map 52 illustrates priorities 1-3, with a fast power down policy applied to priority level 3, while priorities 1 and 2 are indicated as not being powered down in the event of a main power supply failure. In this illustration, priorities 1 and 2 can be of a higher priority level than priority 3.

Once each of the priority groupings is assigned a power down policy, the mapping for each port is assigned in policy map 54. Ports 0-n are each assigned to a given priority level, which is accompanied by a policy as configured in priority map 52. Accordingly, in the exemplary embodiment of diagram 50, ports 0-n are defined to have one of priorities 1, 2 or 3. When a given port is assigned priority 3, such as port 2 in policy map 54, then the port is consequently described as having a fast power down policy in the event of a main power supply failure, due to the policy assigned to priority 3. Accordingly, port 2 is configured to immediately power down in the event of a main power supply failure. Each port in the POE system is similarly configured to have a priority level that is correspondingly associated with a given power down policy. This configuration technique permits a user to rapidly configure all ports in a network, simply by assigning the port to a given priority. High priority devices are assigned to priorities with a power down policy that enables them to remain powered by the backup power supply in the event of a main power supply failure. Other priority groupings can be associated with similar or different power down policies, such as going into standby mode, POR or immediate shutdown. Any reconfiguration of devices for a power down policy implies a simple change in priority as assigned in policy map 54. Ports that are not assigned a priority can be set to default to a standard priority. Once all ports are configured with a given priority and policy, the response to main power supply failure is ready for operation.

Figure 6:
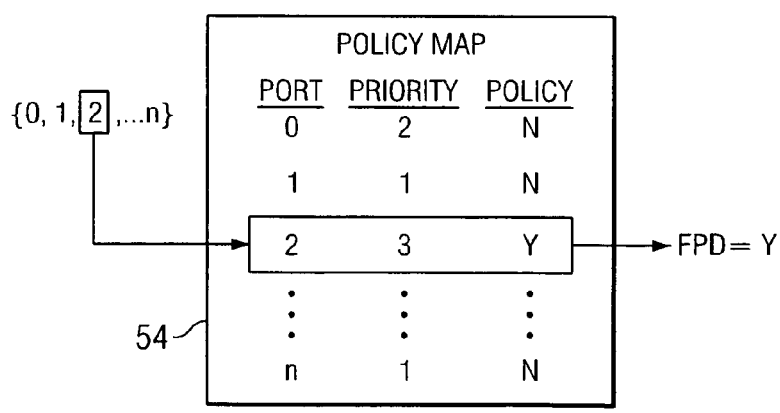
FIG. 6 is an abstract flow diagram illustrating run-time operation of a power down policy in accordance with the present invention.

Referring now to FIG. 6, an illustration of power down policy operation is provided in diagram 60. Policy map 54 provides a data structure for use by the PSE or power controller during run-time to quickly apply a power down policy based on priority. The PSE selects a given port for processing and determines if a particular power down policy should be applied. In the exemplary embodiment of diagram 60, port 2 is selected for review and a power down policy is determined for fast power down of the port. In diagram 60, port 2 is immediately powered down based on the policy identified in policy map 54. Accordingly, when the POE system receives an indication that a main power supply failure has occurred, the PSE initiates an algorithm to access the different ports in the system and power down the ones that have an associated fast power down policy. Because the policy map is configured by priority, the POE system quickly determines which ports are to be powered down and enacts the policy immediately. In an example of operational capability, the POE system can determine which ports in the system should be powered down in a single memory reference.

The present invention permits a flexible and fast power down through an approach that involves both configuration and real time processing. A POE system with the feature of the present invention can quickly power down ports to decrease the latency during which a load is established that a backup power supply can handle. As the latency decreases, the amount of time the main power supply power storage components must be able to supply full load power decreases. Accordingly, with a decrease in time interval during which low priority devices are shut down, the power storage components can be reduced in size or capacity, thereby obtaining significant savings in cost for the main power supply and overall POE system. In addition, the fast power down policy can be applied in a user defined manner that is flexible from both a user standpoint and accommodating physical changes to a POE network.

According to one embodiment of the present invention, software or hardware mapping is maintained in which a single bit is used to identify the power down policy for a single port. For example, a 0 bit can indicate that the power supply to the port should be maintained in the event of a main power supply failure, while a 1 bit can indicate that power supply to the port should be shut down as rapidly as possible. According to another aspect of the present invention, a hardware or software switch can be configured to indicate whether a power down configuration according to the present invention or a default power down system should be enabled. For example, if the switch is in a first state, a default power down policy can be implemented as configured manually by a user. If the switch is in an alternate state, the POE system can implement the flexible power down policy based on priority, as discussed above. With the setting of the switch state, the external signal applied to the controller, such as on pin 22 on controller 20 (FIG. 2), initiates a default power down policy response or the priority based power down policies as described above.

It should be apparent that the present invention is not limited to use with power distribution networks, but can also be used in instances where responses to power supply failures are implemented on a discretionary basis. For example, it is often the case in large computing systems that a main power supply provides power to a number of power subsystems. In the event of a main power supply failure, the power supply subsystems can be shut down, put on standby or reset to adjust the load seen by a backup power supply, in accordance with the present invention.

The structure of priority assignments can be realized in a number of ways in addition to those discussed above. For example, one alternative is to arrange a list of vectors containing port identification and power requirement information as a linked list. Configuration of the ports includes a hierarchical definition of priority for each port. For example, each vector in the linked list could have an implicit priority based on its sequential position in the linked list. That is, the order in which the vectors are linked determines the priority of a given port. During run-time, the linked list could be traversed from one end or the other, that is, from lowest priority to highest or from highest to lowest, depending upon the application and power down implementation desired. As an alternative, the linked list can be constructed as a double linked list, having a starting point and an ending point. In such a doubly linked list, each vector identifying a port and power requirement would point to both a vector with a higher priority and a lower priority in the priority sequenced linked list.

During run-time, when a main power supply fault is identified, the POE system begins processing the vector linked list to identify which ports should remain powered and which ports should be powered down. Depending upon the application, and the configuration of the linked list construction, the PSE has a number of options for processing the linked list. As a first option, the PSE processes the list starting with the highest priority port. As each port is processed, a running sum of power requirements is maintained. When the addition of a power requirement exceeds the total available power, the priority power down process is complete, and the processed ports are identified to maintain their power. As each port is processed as going down in priority on the list, the higher priority ports would receive the available power without exceeding the capacity, such as may be available from the backup power supply. If the total available power is exceeded by powering a device in the prioritized vector list, then the device is not powered to avoid overloading the backup power supply. All remaining lower priority devices in the list are powered down as well. As an alternative, if some amount of power is available after the above processing, and there are one or more ports with power requirements that are less than the available remaining power, those lower priority devices may be powered to achieve the goal of powering as many ports as possible without exceeding the available power budget capacity. In such an alternative, some higher priority devices may not be powered due to their greater power consumption, while some number of lower priority devices may be powered due to their smaller power consumption impact on the overall power budget capacity.

Another run-time alternative involving the use of the linked list configuration provides for moving through the list from lowest priority to higher. In this scenario, a total active system power load can be stored in memory for example, and in the event of a main power supply failure, ports provided in the linked list are shut down beginning with the lowest priority, and the power associated with the low priority port is subtracted from the total active system load. As the list is processed, additional low priority ports are shut down to further reduce the amount of power consumed in the POE system, until the power requirement of the system load falls below the total available power. Once a power load is reached that is below the total available power capacity for the system, the remaining devices in the prioritized linked list remain powered without overloading a backup power supply.

In each of the above-described power down implementations, variations in the available power supply are accommodated by setting an appropriate priority level that translates to a desired power down policy. Priority can be set directly or inferred by positioning within a prioritized linked list. The system also provides for desired fluctuations in the available power supply. For example, if a main power supply fails and an administrator causes additional power to be provided to the POE system beyond that available from a backup power supply, additional devices or ports can be powered automatically through the priority systems described above. That is, with an available back-up power supply capacity, certain priority levels can receive power, and with the intentional addition of power to the system, such as by bringing other backup power supplies online, the devices or ports associated with additional levels of priority can be powered automatically. In the embodiment illustrated in diagram 50 of FIG. 5, for example, priority 1 can be associated with always on, priority 2 can be associated with on when more than backup power supply capacity is available, but less than full load capacity, while priority 3 can represent devices powered down in the event of anything less than full load system capacity power being available. In the example of the linked lists described above, the cutoff point for distinguishing between devices being powered and devices being powered down can be moved automatically to permit more devices to be powered in the event additional power above that supplied by the backup power supply becomes available. In this way, a dynamic power supply can be implemented that accommodates a wide range of flexibility of power supply faults.

Although the present invention has been described in relation to particular embodiments thereof, other variations and modifications and other uses will become apparent to those skilled in the art from the description. It is intended therefore, that the present invention not be limited not by the specific disclosure herein, but to be given the full scope indicated by the appended claims.

What is claimed is:

1. An apparatus for implementing a power down policy for managing backup power usage in response to a power supply failure in an information network that includes a system, such as a Power over Ethernet system or the like, for distributing power to network connected devices, the apparatus comprising:
    a power controller for the network, operable to control power supplied from power sourcing equipment to powered devices connected to the network;
    a memory storage in the power controller for storing an indication of an applicable power down policy for response to the power supply failure;
    a priority indication in the memory storage for indicating a priority of one or more network powered devices, whereby power supplied to the network powered devices during a power down interval is conditioned on an associated priority and power down policy in response to the power supply failure.

2. The apparatus according to claim 1, further comprising an input coupled to the power controller for indicating when a power supply failure occurs.

3. The apparatus according to claim 1, wherein the memory storage further comprises a database for systematically storing the policy indication and the priority indication.

4. The apparatus according to claim 1, further comprising an output coupled to the power controller for controlling power supplied to a network connection, wherein the output is operated in relation to the priority and policy indications.

5. The apparatus according to claim 3, wherein the database further comprises an entry identifying a network connection for association with a priority and policy indication.

6. The apparatus according to claim 4, wherein the priority indication has an associated policy indication, such that the output is subjected to the associated policy indication when assigned the priority indication.

7. The apparatus according to claim 3, wherein the database is arranged as a linked list.

8. The apparatus according to claim 7, wherein the linked list is arranged sequentially in order of priority of network connection.

9. A method for configuring a system, such as a Power over Ethernet system or the like, for distributing power in an information network to network connected devices for managing backup power usage in response to a power supply failure, comprising:
    configuring a powered device network connection to have a given priority;
    associating a power supply failure response policy with the given priority; and
    permitting the response policy to be enacted for the powered device network connection during a power down interval in response to a power supply failure indication.

10. The method according to claim 9 further comprising storing information related to the network connection priority and the response policy in a database.

11. The method according to claim 10, wherein the database is a linked list.

12. The method according to claim 11, further comprising storing power load information associated with the network connection in the linked list.

13. A method for modifying an overall power load in a system, such as a Power over Ethernet system or the like, for distributing power in an information network to network connected devices, for managing backup power usage in response to a power supply failure, comprising:
    identifying a priority of a network connected device;
    applying a power policy associated with the priority to the device; and
    modifying the power load in the power distribution system based on the applied power policy according to an available backup power supply capacity.

14. The method according to claim 13, wherein identifying further comprises determining the location of an element representative of the device in a linked list.

15. The method according to claim 13, wherein identifying further comprises reading an entry in a database associated with the device.

16. The method according to claim 13, further comprising receiving a signal indicative of a power supply failure.

17. The method according to claim 13, further comprising sequentially accessing a number of memory elements at least one of which being associated with the network device to identify one or more of a policy and a priority associated with the network device.

18. The method according to claim 13, wherein the power policy provides for immediate power down of the device.

19. The method according to claim 9, wherein the response policy provides for immediately powering down the network connection.

20. The method according to claim 17, further comprising identifying a power consumption value associated with the network device.

21. The method according to claim 20, further comprising applying arithmetic operations on the power consumption value to contribute to determine when an available power supply capacity is reached.

* * * * *